Jan. 25, 1955

A. H. DICKINSON 2,700,750

MEASURING AND INDICATING SYSTEM

Filed April 25, 1952

INVENTOR
A. H. DICKINSON
BY
Albert R. Hodges
ATTORNEY

FIG. 4

United States Patent Office 2,700,750
Patented Jan. 25, 1955

2,700,750
MEASURING AND INDICATING SYSTEM

Arthur H. Dickinson, Greenwich, Conn., assignor to International Business Machines Corporation, New York, N. Y., a corporation of New York Application April 25, 1952, Serial No. 284,377

16 Claims. (Cl. 324—99)

This invention relates to measuring and indicating systems, and more particularly to improved means for measuring and indicating or manifesting the value of a variable quantity such as an electrical potential.

A principal object of the present invention is to provide digital manifestation of a variable quantity with a high degree of linearity, sensitivity, accuracy and reproducibility.

Another object of the present invention is the provision of digital manifestation of a variable quantity without appreciably loading the source of the quantity.

A further object of the present invention is to provide a plurality of successive digital manifestations of a variable quantity automatically.

Still another object of the present invention is to provide successive digital manifestations at a relatively rapid rate which is independent of the magnitude of the variable quantity under measurement.

An additional object of the present invention is the provision of a digital manifestation of a variable quantity on a register which automatically reverses and counts backwardly an adjustable predetermined amount before again reversing to count forwardly for the next successive digital manifestation.

In accordance with the present invention there is provided a variable quantity measuring and manifesting device which comprises the combination of a plurality of structural elements. These elements include a source of oscillations, and a register normally responsive in a first direction to these oscillations. Gating means are interposed between the source of oscillations and the register, and these gating means are adapted to control the flow of oscillations therebetween. Translating means are provided which are adapted for developing a potential proportional in magnitude to the setting of the register. Means are provided for comparing this potential with the variable quantity to be measured, and for actuating the gating means when the potential is proportional to the variable quantity. Means are also provided for manifesting or indicating the setting of the register after the above mentioned actuation of the gating means. Means are provided for again actuating the gating means and for rendering the register responsive in the opposite direction to the oscillations.

In accordance with an important feature of the present invention, means may also be provided for restoring the register to its normal direction of responsiveness to the oscillations at the end of a substantially predetermined count.

An additional feature of the present invention is the provision of means for suppressing actuation of the gating means when the value of the variable quantity is less than that corresponding to the above-mentioned predetermined count. Still another feature is the provision of means for suppressing the responsiveness of the register in the normal direction when the variable quantity decreases by more than that corresponding to the above-mentioned predetermined count.

Other objects and features of the present invention will be pointed out in the following description and claims and illustraetd in the accompanying drawings, which disclose, by way of example, the principle of the invention and the best mode, which has been contemplated, of applying that principle.

In the drawings, in which like reference numerals designate like components.

The system as a whole

Figure 1:
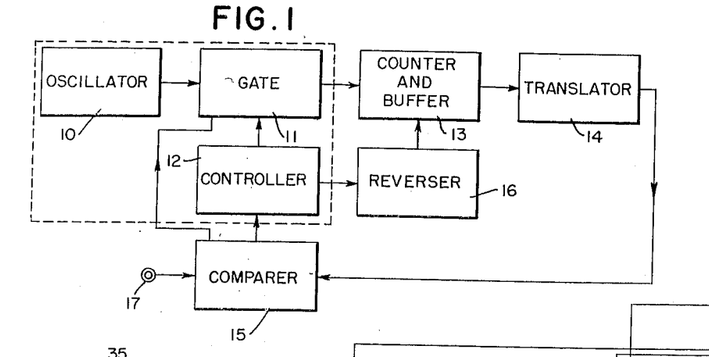
Fig. 1 is a block diagram of a measuring and indicating device in accordance with the present invention.

Referring to Fig. 1, there is shown a variable quantity measuring and manifesting device in accordance with the present invention which comprises an oscillator unit 10, a gate unit 11, a controller unit 12, a register or counter and buffer unit 13, a translator unit 14, a comparer unit 15, and a reverser unit 16. When the system is in operation, oscillator 10 produces a steady train of pulses which are supplied to gate unit 11. Gate unit 11 is under control of unit 12. Each complete cycle of operation of the system comprises three portions, the first of which is utilized for determining the digital value of the unknown variable quantity, the second of which is utilized for manifesting or indicating this value, and during the third of which the register or counter is caused to operate backwardly. Let it be assumed that a cycle has been manually initiated, so that controller unit 12 causes gate unit 11 to open. Under this condition, the pulses from oscillator unit 10 pass through gate unit 11 into counter and buffer unit 13, in which they are counted.

The digital value developed in counter and buffer unit 13 is now converted, by means of translator unit 14, into an electrical potential which is a direct function of the setting of counter unit 13. This potential is compared, in comparer unit 15, with the unknown variable quantity applied to terminal 17. When the potential from unit 14 is proportional to or equal to the variable quantity, comparer unit 15 causes controller unit 12 to close gate 11. This corresponds with the end of the first portion of the operating cycle. After a short delay corresponding with the second portion of the operating cycle and during which the counter setting may be read or otherwise utilized, reverser unit 16 causes gate 11 to re-open for a predetermined time interval during which counter unit 13 is caused to count backwardly the pulses from oscillator unit 10. This interval, during which a substantially predetermined count occurs, constitutes the third portion of the operating cycle, and at its end the system is made ready for the next measurement of the unknown quantity. Thus, the system may be said to provide "forced hunting" in securing a digital manifestation of the unknown quantity.

The oscillator, gate and controller units

Figure 2:
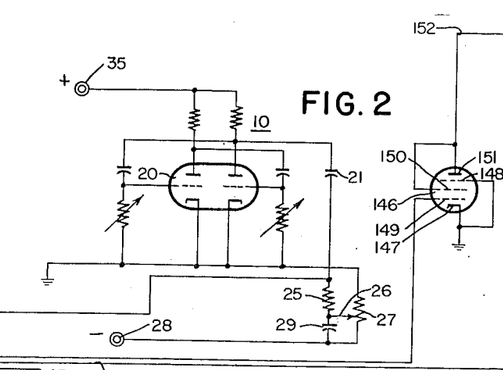
Fig. 2 is a schematic circuit diagram of the oscillator, gate, and controller units of Fig. 1.

Referring to Fig. 2 of the drawings, oscillator 10 comprises an electron discharge device 20, preferably of the double triode type, arranged to operate as a conventional multivibrator to provide a continuous train of output pulses. These pulses are supplied, by means of a coupling capacitor 21, to the suppressor electrode 22 of an electron discharge device 23, preferably of the pentode type with its cathode 24 grounded as shown. Suitable direct-current bias is applied to suppressor electrode 22 through a resistor 25 the lower end of which is connected to the movable arm 26 of a potentiometer 27, which in turn is shunted between ground and a suitable source of negative potential 28. Arm 26 is bypassed to source 28 by a capacitor 29.

Figure 3:
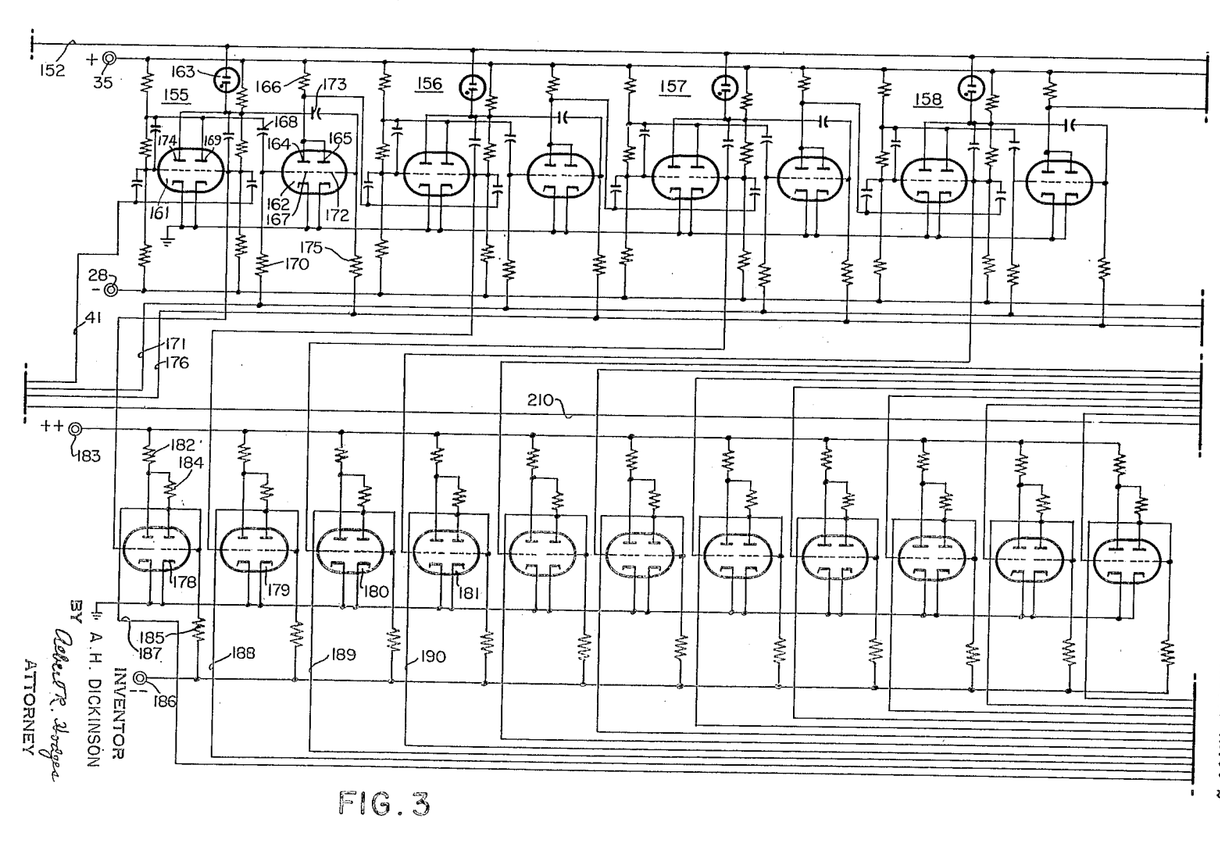
Figs. 3 and 4 together comprise a schematic circuit diagram of the register or counter and buffer unit of Fig. 1, certain of the duplicate elements having been illustrated in block form, and of the translator unit of Fig. 1.
Figure 4:
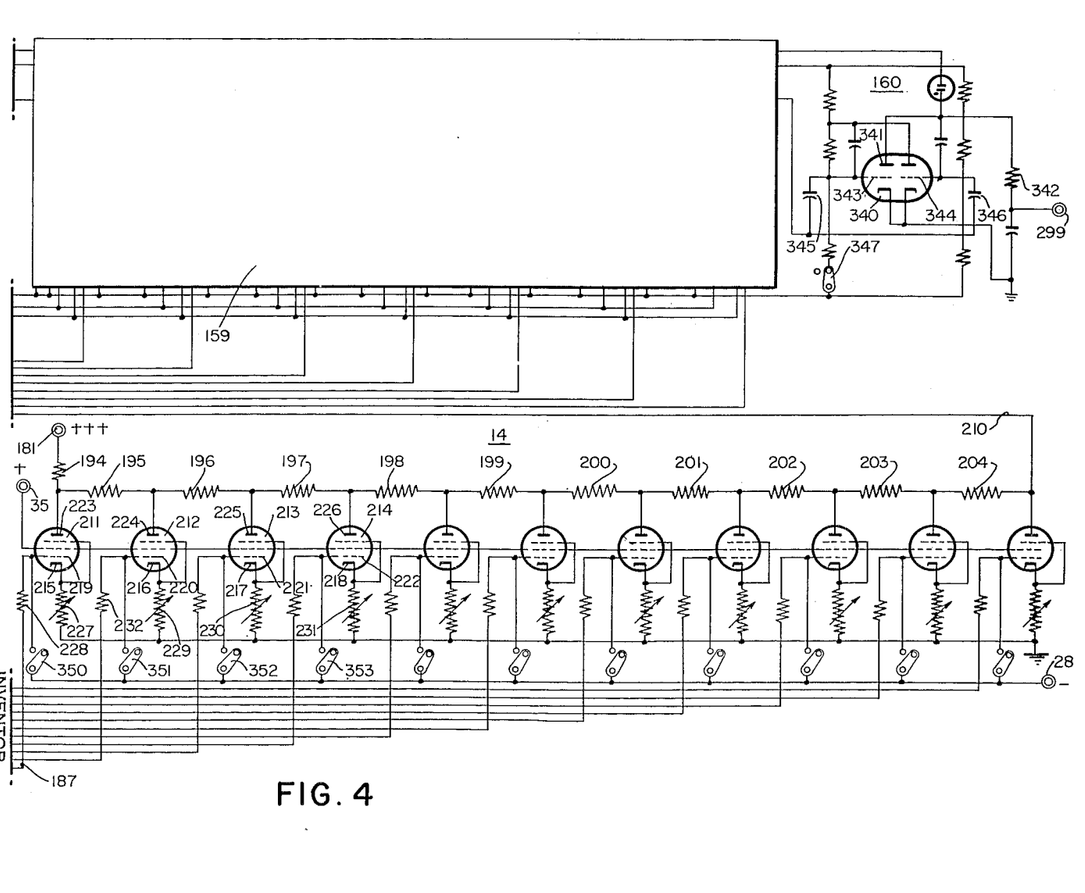

Electron discharge device 23 comprises the gate. Control electrode 30 is connected to junction 31 in a potential divider comprising resistors 32, 33 and 34 connected in series between positive potential source 35 and negative potential source 28. The potential of junction 31 is normally such that discharge device 23 is substantially non-conductive. Screen electrode 36 of discharge device 23 is connected by a resistor 37 to positive potential source 35, and is bypassed to ground by a capacitor 38. A resistor 39 is connected between positive potential source 35 and anode 40 of discharge device 23, and a lead 41 is connected to anode 40 for the purpose of supplying output pulses from the gate to counter and buffer unit 13 (Figs. 3 and 4).

For the purpose of manually causing the gate to open, there is provided a capacitor 42 connected between negative potential source 28 and the movable arm 43 of an SPDT switch 44, the left-hand terminal 45 of which connects to junction 31 and the right-hand terminal 46 connects to the junction of resistors 47 and 48 connected in series between positive potential source 35 and ground. When switch arm 43 is thrown to the right, capacitor 42 becomes charged to a potential corresponding to the potential difference between switch terminal 46 and source 28. Throwing switch arm 43 to the left causes capacitor 42 to discharge, raising the potential of junction 31 to somewhat above ground potential, so that gate discharge device 23 may conduct whenever a positive-going pulse is applied to its suppressor electrode 22 by oscillator 10 through capacitor 21. This in turn causes a negative-going pulse to be developed in output lead 41 for application to counter unit 13 (Figs. 3 and 4).

A gate trigger circuit 49 is provided, comprising an electron discharge device 50 preferably of the type having a pair of triode portions. This device operates as a conventional bi-stable multivibrator. Cathodes 51 and 52 are grounded. Right-hand control electrode 53 is connected to junction 31. Left-hand anode 54 is connected to the junction of resistors 32 and 33, and a capacitor 55 is shunted across resistor 33. A series network comprising resistors 56, 57 and 58 and a SPST switch 153 is connected between positive potential source 35 and negative potential source 28. Right-hand anode 59 of discharge device 50 is connected to junction 60 of resistors 56 and 57, and left-hand control electrode 61 is connected to junction 62 of resistors 57 and 58. A capacitor 63 is shunted across resistor 57. The potentials of junctions 31 and 62 are normally such that the left-hand portion of discharge device 50 is conductive and its right-hand portion non-conductive. This condition may be designated the "off" condition of the gate trigger circuit, the opposite condition being designated the "on" condition. The latter condition results, for example, when switch arm 43 is thrown to the left. Gate trigger circuit 49 may be restored to its "off" condition manually by momentarily opening switch 153.

For the purpose of turning gate trigger circuit 49 "off" automatically, and hence causing gate 11 to be closed at a desired time, positive pulses are developed in comparer unit 15 (Fig. 5) and supplied by means of lead 65 to left-hand control electrode 66 of dual electron discharge device 67, cathodes 68 and 68a of which are grounded. Resistors 69 and 70 are connected in series between left-hand anode 71 of discharge device 67 and positive potential source 35, and their junction 72 is coupled by means of a capacitor 73 to junction 31. The left-hand portion of discharge device 67 is maintained normally non-conductive by the application, through a resistor 74, of a suitable negative potential to left-hand control electrode 66, this potential being derived from a potentiometer 75 shunted between ground and negative potential source 28, the movable arm being bypassed to ground by a capacitor 76. A positive pulse applied to control electrode 66 by lead 65 causes the left-hand portion of discharge device 67 to become momentarily conductive, the resultant negative-going pulse at junction 72 turning gate trigger circuit 49 "off" and causing gate 11 to be closed.

To provide automatic re-opening of gate 11 after a predetermined time interval representing the manifesting portion of the operating cycle, lead 65 is also connected to control electrode 77 of an electron discharge device 78, preferably of the triode type with its cathode 79 grounded. Resistors 80 and 81 are connected in series between anode 82 of discharge device 78 and positive potential source 35. Junction 83 of resistors 80 and 81 is coupled by a capacitor 84 to left-hand control electrode 85 of a dual electron discharge device 86 having its cathodes 87 and 88 grounded and being arranged, with the associated components, to operate as a conventional self-restoring trigger circuit 89 in which the left-hand portion is normally conductive, this condition being designated the "off" condition of the circuit. A series network comprising resistors 90, 91 and 92 is connected between positive potential source 35 and negative potential source 28.

The junction 93 of resistors 90 and 91 is connected to right-hand anode 94 of discharge device 86. A capacitor 95 is shunted across resistor 91. Resistors 96 and 97 are connected between left-hand anode 98 of discharge device 86 and positive potential source 35. A neon indicator tube 99 is connected between left-hand anode 98 and ground. Right-hand control electrode 100 of discharge device 86 is connected through a resistor 101 to the movable arm of a potentiometer 102 shunted between ground and negative potential source 28, the movable arm being bypassed to source 28 by a capacitor 103. A capacitor 104 is connected between right-hand control electrode 100 and left-hand anode 98.

Junction 93 is coupled by a capacitor 128 to right-hand control electrode 129 of discharge device 67. A potential suitable for maintaining the right-hand portion of discharge device 67 normally non-conductive is applied to right-hand control electrode 129 through a resistor 130 from a voltage divider comprising resistors 131 and 132 connected in series between ground and negative potential source 28. Resistors 133 and 134 are connected between right-hand anode 135 of discharge device 67 and positive potential source 35, their junction being coupled by a capacitor 136 to left-hand control electrode 61 of discharge device 50.

In operation, automatic re-opening of gate 11 after a predetermined time interval is achieved in the following manner. A positive pulse on lead 65 renders discharge device 78 conductive, producing a negative-going pulse at junction 83. This in turn turns self-restoring trigger circuit 89 "on," in which condition it remains for a period of time determined by the values of capacitor 104 and resistors 97, 96 and 101, and by the bias potential due to the setting of potentiometer 102. When trigger circuit 89 switches "off," the positive-going pulse appearing at junction 93 is applied by means of capacitor 128 to right-hand control electrode 129 of discharge device 67, thus causing the right-hand portion of this device to become conductive and a negative-going pulse to be developed at junction 62. This pulse causes gate trigger circuit 49 to switch "on," which in turn causes gate 11 to re-open and the third portion of the operating cycle to begin.

The junction 105 of resistors 96 and 97 is coupled by a capacitor 106 to left-hand control electrode 107 of a dual electron discharge device 108 having its cathode 109 and 110 grounded and being arranged, with the associated components, to operate as a conventional self-restoring trigger circuit 111. A series network comprising resistors 112, 113 and 114 is connected between positive potential source 35 and negative potential source 28, the junction 115 of resistors 112 and 113 being connected to right-hand anode 116 of discharge device 108, and the junction 117 of resistors 113 and 114 being connected to left-hand control electrode 107. A capacitor 118 is shunted across resistor 113. Resistors 119 and 120 in series are connected between the left-hand anode 121 of discharge device 108 and positive potential source 35. A neon indicator tube 122 is connected between left-hand anode 121 and ground. Right-hand control electrode 123 of discharge device 108 is connected through a resistor 124 to the movable arm of a potentiometer 125 shunted between ground and negative potential source 28, the movable arm of the potentiometer being bypassed to source 28 by a capacitor 126. A capacitor 127 is connected between left-hand anode 121 and right-hand control electrode 123.

Figure 5:
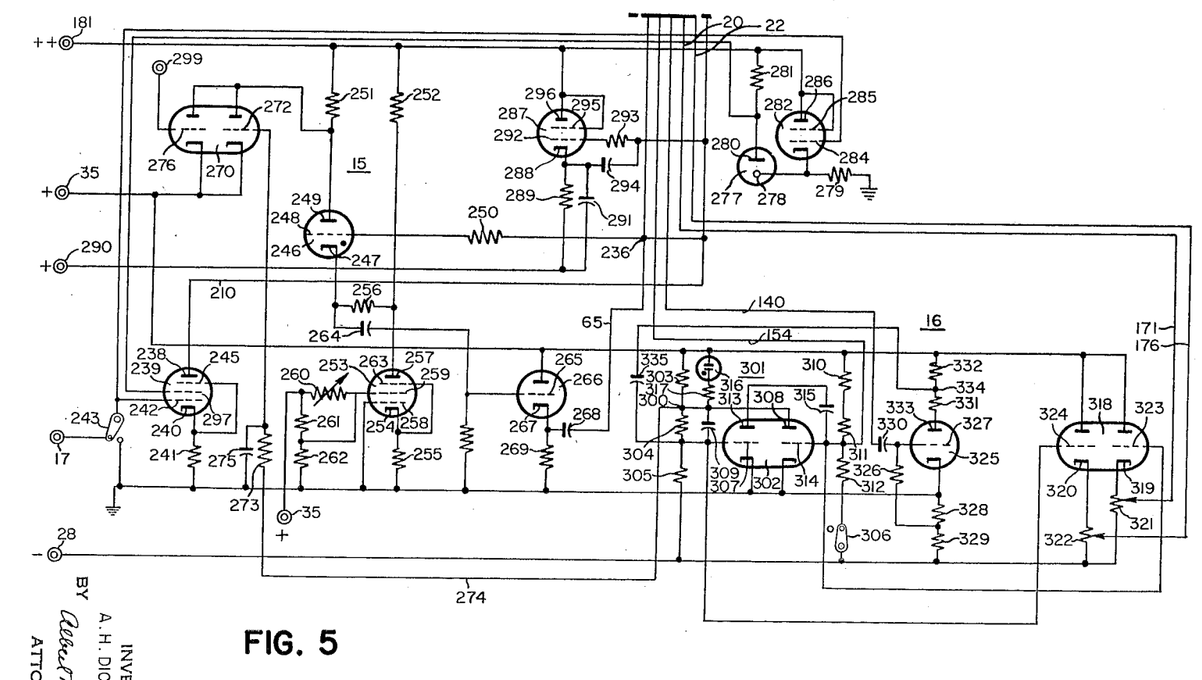
Fig. 5 is a schematic circuit diagram of the comparer unit and the reverser unit of Fig. 1.

When trigger circuit 89 switches "off," the negative-going pulse at junction 105 causes self-restoring trigger circuit 111 to be switched "on," a condition which is maintained for an interval of time dependent upon the values of the components comprising this circuit and by the bias potential due to the setting of potentiometer 125. Since the frequency of oscillator 10 remains substantially constant, a substantially predetermined count is achieved during the time interval that trigger circuit 111 remains "on." If desired, a controllable count may be obtained by appropriate setting of potentiometer 125. It will be understood, of course, that other suitable arrangements for achieving a substantially predetermined count may be utilized without departing from the scope of the present invention. As trigger circuit 111 switches "off," junction 115 rises in potential. This positive pulse, supplied on lead 140, is utilized in a manner later to be described in connection reverser unit 16 (Fig. 5).

For the purpose of maintaining extinguished the indicators forming a part of counter and buffer unit 13 (Figs. 3 and 4) during the first and third portions of each complete cycle of operation, there is provided an electron discharge device 146, preferably of the pentode type and having its cathode 147 and its suppressor electrode 148 grounded. Control electrode 149 of discharge device 146 is connected to junction 62 of gate trigger circuit 49. Screen electrode 150 and anode 151 of discharge device 146 are connected together and to a lead 152. In the first and third portions of the operating cycle, trigger circuit 49 is "on," as explained above, and discharge device 146 is non-conductive, thus interrupting the return path for the indicators of counter and buffer unit 13 (Figs. 3 and 4). During the second portion of the operating cycle, however, trigger circuit 49 is "off," so that junction 62 is relatively positive. Thus, discharge device 146 is rendered conductive, thereby providing a return path for the indicators of unit 13 (Figs. 3 and 4).

The counter and buffer unit

Referring to Figs. 3 and 4 of the drawings, the register or counter comprises a plurality of bi-stable multivibrators or trigger circuits connected for cascade operation on a straight binary basis. Trigger circuits 155–158 are shown in detail. Seven identical circuits are included in box 159. A twelfth trigger circuit 160 is also provided, for a purpose later to be described. Thus, the counter is able to count or register a binary number having as many as eleven digits, and counting may take place either in an ascending or forward direction, or in a descending or reverse direction.

Trigger circuit 155 with its associated circuits, which is typical of the remaining trigger circuits, comprises an electron discharge device 161 of the dual type as shown, arranged in a conventional bi-stable multivibrator circuit, and a direction-determining electron discharge device 162, also of the dual type. Associated with the left-hand portion of discharge device 161 is a neon indicator or glow tube 163, which provides an indication when trigger circuit 155 is in its "on" condition, that is, when the left-hand portion of discharge device 161 is non-conductive.

The cathodes of discharge device 162 are grounded, and anodes 164 and 165 are connected together and through a resistor 166 to positive potential source 35. Anodes 164 and 165 are also connected to the input of trigger circuit 156. Left-hand control electrode 167 of device 162 is coupled by a capacitor 168 to right-hand anode 169 of discharge device 161, and is connected through a resistor 170 to a lead 171, which is maintained at either of two predetermined potentials in a manner later to be described. Right-hand control electrode 172 of discharge device 162 is coupled by a capacitor 173 to left-hand anode 174 of discharge device 161, and is connected by a resistor 175 to a lead 176, likewise maintained at either of two predetermined potentials in alternation with lead 171.

In operation, when trigger circuit 155 changes from its "on" to its "off" condition, anode 169 of discharge device 161 rises in potential, since the right-hand portion becomes non-conductive. Through capacitor 168, a positive pulse is applied to control electrode 167 of discharge device 162. If lead 171 is at the higher of its two potential values, the left-hand portion of discharge device 162 is rendered conductive. The resultant negative pulse appearing at anodes 164 and 165 serves to reverse the status of trigger circuit 156. This is the condition for forward operation of the counter, since the switching "off" of trigger circuit 155 causes a reversal of the status of succeeding trigger circuit 156. Reverse operation is achieved when lead 176, instead of lead 171, has the higher value. In this case, the turning "on" of trigger circuit 155 causes left-hand anode 174 to rise in potential. The resultant positive pulse, applied through capacitor 173, is sufficient, in view of the potential of lead 176, to render the right-hand portion of discharge device 162 conductive. The negative pulse at anodes 164 and 165 causes reversal of the status of trigger circuit 156. Thus it will be apparent that the direction of operation of the counter is determined by the relative potentials of leads 171 and 176.

Summarizing the counter operation, let it first be assumed that the counter is adjusted for operation in the forward direction. In this case, the switching of trigger circuit 155 from its "off" to its "on" condition will have no effect upon trigger circuit 156. The next negative-going input pulse on lead 41, however, will switch trigger circuit 155 to its "off" condition, and this in turn will change trigger circuit 156 from its "off" to its "on" condition. Now let it be assumed that the counter is adjusted for operation in the backward direction. In this case, the switching of trigger circuit 155 from its "off" to its "on" condition causes trigger circuit 156 to change from its "off" to its "on" condition. A change by trigger circuit 155 in the opposite sense, however, does not affect the condition of trigger circuit 156.

Associated with trigger circuits 155—158 are buffer elements comprising respectively dual electron discharge devices 178, 179, 180 and 181. Additional identical buffer elements are associated with the trigger circuits of block 159. It will be understood, of course, that each dual discharge device may be replaced by two separate discharge devices if desired, or by one discharge device and a rectifier having a relatively high ratio between its forward and backward resistances. When trigger circuit 155 is "on," the right-hand control electrode of its dual electron discharge device 161 is at substantially ground potential. As shown, this electrode is connected to the left-hand control electrode of discharge device 178, so that the left-hand portion of this device is highly conductive and there is a substantial potential drop across associated load impedance element or resistor 182 connected between the left-hand anode of device 178 and a source 183 of high positive potential. A second impedance element or resistor 184 is connected between the left- and right-hand anodes of discharge device 178, the right-hand anode being connected to the right-hand control electrode to form a diode and being connected through a third impedance element or resistor 185 to a source 186 of high negative potential. Resistors 184 and 185 are so proportioned that when the left-hand portion of discharge device 178 is highly conductive the right-hand anode of this discharge device is substantially negative with respect to ground. Under this condition, the right-hand portion of discharge device 178 is non-conductive and has no effect upon the operation of the buffer. On the other hand, when trigger circuit 155 is "off," the left-hand portion of discharge device 178 is non-conductive, so that the potential of the right-hand anode of discharge device 178 tends to rise above ground potential. The right-hand portion of this discharge device comprises a clamping means which provides a clamping action, however, with the result that the right-hand anode of this device under this condition is maintained at a potential very close to ground potential. By means of a lead 187, the potential of this anode is applied to translator unit 14 (Fig. 4). Similar output potentials are developed by discharge devices 179, 180 and 181, and passed on to translator unit 14 respectively by leads 188, 189 and 190. Similar connections are provided between the remaining trigger circuit of the counter unit and translator unit 14. In the manner just described, therefore, a plurality of output voltages are provided, each of which is either substantially negative with respect to ground or maintained very closely at ground potential, depending upon whether or not the corresponding trigger circuit of the counter is "on" or "off."

This buffer arrangement is disclosed and claimed in copending application Serial No. 270,412, R. C. Paulsen, filed February 7, 1952, and assigned to the same assignee as the present application.

The translator unit

Referring to Fig. 4 of the drawings, the translator unit comprises impedance elements or resistors 194—204 connected between high positive potential source 181 and translator output lead 210. The portion of the translator associated with buffer discharge devices 178—181 comprises electron discharge devices 211, 212, 213 and 214, preferably of the pentode type, and respectively having cathodes 215, 216, 217 and 218, control electrodes 219, 220, 221 and 222, and anodes 223, 224, 225 and 226. The suppressor electrodes of these discharge devices are connected respectively to their cathodes, and the screen electrodes are connected to positive potential source 35.

Cathode 215 of discharge device 211 is connected to ground through an adjustable resistor 227. Control electrode 219 is connected by means of a resistor 228 to lead 187 from the buffer (Fig. 3). Anode 223 is connected to the junction of resistors 194 and 195. Discharge devices 212, 213 and 214 have their cathodes 216—218 connected to ground respectively through adjustable resistors 229, 230 and 231. Their control electrodes 220—222 are connected by resistors 232, 233 and 234 respectively to leads 188, 189 and 190 from the buffer (Fig. 3). Anode 224 of discharge device 212 is connected to the junction of resistors 195 and 196, anode 225 of discharge device 213 to the junction of resistors 196 and 197, and anode 226 of discharge device 214 to the junction of resistors 197 and 198. It will be understood that similar connections from the terminals of resistors 198—204 are made to the anodes of the remaining and similarly arranged electron discharge devices of the translator. Switches 350—353, connected respectively between control electrodes 219—222 and negative potential source 28 are provided so that the operation condition of each of discharge devices 211—214 may be determined independently. These switches are normally open. Similar switches are provided for the remaining stages, as shown.

It will be recalled from the description of the buffer of Fig. 3 that leads 187—190 are either substantially negative with respect to ground or are maintained very closely at ground potential, depending upon whether or not the corresponding trigger circuit of the counter is "on" or "off." Assume for the moment that trigger circuit 155 of the counter is "off." Under this condition, lead 187 is very closely at ground potential, so that electron discharge device 211 is conductive, the degree of conductivity being readily adjusted by means of adjustable resistor 227. Because of the inherent characteristic of a pentode, the resultant current flow remains substantially uniform in spite of variations in the potential drop across the discharge device. This conductivity of discharge device 211 produces a predetermined potential drop across resistor 194. Now let it be assumed that trigger circuit 155 of the counter is "on," so that lead 187 is maintained at a substantially negative potential with respect to ground. This renders discharge device 211 non-conductive, with the result that there is no potential drop across resistor 194 due to anode current flowing in discharge device 211. A similar operation occurs in each of the remaining discharge devices comprising the translator unit, so that the total potential drop across resistors 194—204 due to the anode currents of these discharge devices is a direct function of the "on" and "off" pattern established in the trigger circuits of the counter. By proper choice of the values of resistors 194—204, it is possible to secure a desired potential difference between positive potential source 181 and output lead 210 corresponding with the count momentarily present in the counter.

By way of specific example, let it be assumed that resistors 194—204 have the following resistance values, expressed in ohms:

| Resistor: | Resistance in ohms |
| --- | --- |
| 194 | 100 |
| 195 | 100 |
| 196 | 200 |
| 197 | 400 |
| 198 | 800 |
| 199 | 1,600 |
| 200 | 3,200 |
| 201 | 6,400 |
| 202 | 12,800 |
| 203 | 25,600 |
| 204 | 51,200 |

Now let it be assumed that each electron discharge device is adjusted to have an anode current of 1.0 milliampere when it is conductive. Under these conditions, if all eleven electron discharge devices are conductive the total potential drop between positive potential source 181 and output lead 210 due to their anode currents will be 204.7 volts. This is the condition which corresponds with the 0000 setting of the counter. Assume now that the counter has advanced to 0001, so that discharge device 211 is rendered non-conductive and the current through resistor 194 is 0.001 ampere less than previously, with the result that the potential of output lead 210 rises toward that of positive potential source 181 by 0.1 volt. Upon reaching the maximum count of 2047, output lead 210 will have risen toward positive potential source 181 by a total of 204.7 volts.

It will be seen from this specific example, therefore, that the values of resistors 194—204 are such that, as the counter progresses incrementally from 0000 to 2047, the voltage difference between output lead 210 and positive potential source 181 decreases by 0.1 volt for each unit count applied to the input of the counter. It is this potential change which forms the output of translator unit 14 and which is applied to comparer unit 15 (Figs. 1 and 5).

This translator arrangement is disclosed and claimed in copending application Serial No. 228,432, A. H. Dickinson and R. C. Paulsen, filed May 26, 1951, and assigned to the same assignee as the present application.

*The comparer unit*

Referring to Fig. 5 of the drawings, lead 210, comprising the output lead of translator unit 14 (Fig. 4), is connected to a junction 236. Junction 236 is connected to anode 238 of an electron discharge device 239 of the pentode type. Cathode 240 of discharge device 239 is grounded through a resistor 241. Control electrode 242 is connected by a switch 243 either to input terminal 17, to which the unknown potential is applied, or to ground. The potential of screen electrode 297 with respect to cathode 240 is maintained substantially constant by an arrangement which will be described later. Suppressor electrode 245 is connected to cathode 240.

It will be apparent that the potential of junction 236 with respect to ground will be dependent upon the potential drop in resistors 194—204 (Fig. 4) due both to the anode currents of the electron discharge devices of translator unit 14 and to the anode current of electron discharge device 239, as well as to the potential drop across resistor 241 due to the anode current of the latter discharge device. An increase in the anode current of discharge device 239, such as might be caused by applying an input potential between terminal 17 and ground, would tend to decrease the potential between junction 236 and ground. A decrease in the conductivity of one or more of the electron discharge devices of translator unit 14 would tend to cause an increase of potential at junction 236 with respect to ground.

In order to utilize this effect, there is provided a gaseous discharge device 246 having a cathode 247, a control electrode 248 and an anode 249. Control electrode 248 is connected to junction 236 by a resistor 250. A resistor 251 is connected between positive potential source 181 and anode 249. For the purpose of maintaining substantially constant the anode-cathode potential of discharge device 246 so that it will fire at fixed control-electrode potential, there is provided a series network between positive potential source 181 and ground comprising a resistor 252 and an electron discharge device 253, preferably of the pentode type and having a cathode 254 which is grounded through a resistor 255. A resistor 256 is connected between cathode 247 of discharge device 246 and anode 257 of discharge device 253. Control electrode 258 of discharge device 253 is grounded. Screen electrode 259 is connected through an adjustable resistor 260 to positive potential source 35, suitable additional resistor 261 and 262 being provided and arranged as shown. Suppressor electrode 263 is connected to cathode 254.

In operation, assuming first that the counter (Figs. 3 and 4) is set at 0000 and that switch 243 is in its right-hand position, resistor 260 is adjusted so that gaseous discharge device 246 is barely extinguished. In other words, a small increase in the potential of junction 236 with respect to ground would cause discharge device 246 to fire, with the result that a large positive-going pulse is developed at cathode 247.

Now let it be assumed that switch 243 is in its left-hand position and that an unknown potential has been applied to input terminal 17. This causes the potential of junction 236 to decrease with respect to ground, so that control electrode 248 of discharge device 246 becomes more negative with respect to cathode 247. As previously described, however, the counter has begun counting, so that the potential drop across resistors 194—204 (Fig. 4) gradually decreases until the potential of junction 236 with respect to ground rises sufficiently to cause discharge device 246 to fire. The resultant positive-going pulse at cathode 247 is applied by means of a capacitor 264 to control electrode 265 of an electron discharge device 266, operating as a cathode follower and having its cathode 267 coupled by means of a capacitor 268 to lead 65. The resultant positive-going pulse developed across cathode resistor 269 causes the closing of gate unit 11, as previously described in connection with Fig. 2, thus terminating the first portion of a complete operating cycle.

For the purpose of extinguishing discharge device 246 after it fires, there is provided a dual electron discharge device 270 having its cathodes connected to positive potential source 35. Right-hand control electrode 272 of device 270 is connected through a resistor 273 and lead 274 to junction 300 in reverser unit 17, described later. Control electrode 272 is bypassed to ground by a capacitor 275. Both anodes of device 270 are connected to anode 249 of discharge device 246. Left-hand control electrode 276 of discharge device 270 is connected to junction 299 of trigger circuit 160 in the counter (Figs. 3 and 4). When either of control electrodes 272 and 276 is driven positive, the resultant current flow through resistor 251 causes the potential of anode 249 of discharge device 246 to fall below that of its cathode 247, so that device 246 is extinguished. The manner in which positive potentials are applied to control electrodes 272 and 276 will be described later.

In order that the anode current of discharge device 239 shall vary linearly with respect to changes in the unknown potential applied to terminal 17 and hence to its control electrode 242, it is necessary that the potential of screen electrode 297 remain substantially constant with respect to that of cathode 240 of discharge device 239. For the purpose of accomplishing this, there is provided a voltage regulator tube 277, preferably of the cold-cathode type, having its cathode 273 connected through an impedance element or resistor 279 to ground, and having its anode 280 connected through an impedance element or resistor 281 to positive potential source 181. Screen electrode 297 of discharge device 239 is connected to anode 280 of regulator tube 277. There is also provided an electron discharge device 282, preferably of the tetrode type and having its cathode 283 connected to cathode 278 of regulator tube 277. Control electrode 284 of discharge device 282 is connected to control electrode 242 of discharge device 239. Screen electrode 285 and anode 286 of discharge device 282 are connected together and to positive potential source 181. Since discharge device 282 operates as a cathode follower, variations in the potential of its control electrode 284 due to changes in the unknown potential applied to input terminal 17 are reflected linearly in the potential drop existing across resistor 279 due to the anode current of discharge device 282. Thus the potential of cathode 282 varies directly as does that of cathode 240 of discharge device 239. Because of the action of voltage regulator tube 277, its anode 280 remains at a substantially constant potential above that of its cathode 278, with the result that the difference in potential between screen electrode 297 and cathode 240 of discharge device 239 remains substantially constant, irrespective of the magnitude of the unknown potential applied between input terminal 17 and ground. This arrangement for securing a linear relationship between the unknown potential applied to terminal 244 and the anode current of discharge device 239 is disclosed and claimed in copending application Serial No. 270,413, R. C. Paulsen, filed February 7, 1952, and assigned to the same assignee as the present application.

As previously described, counter and buffer unit 13 (Figs. 3 and 4) supplies potentials to the control electrodes of the electron discharge devices comprising translator unit 14 (Fig. 4). Since switching of the trigger circuits in the counter unit is accompanied by time delays, it will be apparent that, during the time such switching occurs, the potentials supplied by translator unit 14 may be lower or higher than the ultimate levels achieved by the counter unit upon the completion of switching. Accordingly, it is desirable to provide means for preventing such spurious relatively short-period fluctuations of higher potential from causing premature operation of the comparer unit without, however, appreciably affecting the response of the system due to relatively long-period fluctuations. In order to accomplish this, there is provided an electron discharge device 287, preferably of the tetrode type and having its cathode 288 connected through an impedance element or resistor 289 to a suitable source of positive potential 290. Resistor 289 is shunted by a capacitor 291. Control electrode 292 of discharge device 287 is connected through an impedance element or resistor 293 to junction 236, and an impedance element or capacitor 294 is connected between this junction and cathode 288 of discharge device 287. The time constant due to resistor 293 and the input capacitance of discharge device 287 is preferably of the order of the period of the spurious short-period fluctuations at junction 236 and small compared with the period of the long-period fluctuations. Screen electrode 295 and anode 296 of discharge device 287 are connected together and to positive potential source 181.

In operation, discharge device 287 operates as a cathode follower, so that changes in the potential of control electrode 292 cause corresponding changes in the potential drop across resistor 289, this relationship being substantially linear. Capacitor 294 is therefore always charged to the same value of potential, and it is of sufficient capacitance to cause bypassing of any spurious pulses which may be developed at junction 236 when the trigger circuits of counter unit 13 are switching. The purpose of capacitor 291 is merely to augment the stabilizing action of capacitor 294 and, although helpful for this purpose, it is not an essential component. This arrangement for the suppression of undesired fluctuations is disclosed and claimed in copending application Serial No. 270,414, A. H. Dickinson and R. C. Paulsen, filed February 7, 1952, and assigned to the same assignee as the present application.

*The reverser unit*

The reverser unit 16, shown in Fig. 5 of the drawings, includes a trigger circuit 301 comprising a dual electron discharge device 302 having its cathodes grounded. A network comprising resistors 303, 304 and 305 is connected in series between positive potential source 35 and negative potential source 28. Left-hand control electrode 307 of discharge device 302 is connected to the junction of resistors 304 and 305. Junction 300 of resistors 303 and 304 is connected to right-hand anode 308 of device 302. Resistor 304 is shunted by a capacitor 309. A series network comprising resistors 310, 311 and 312 and SPST switch 306 is connected between positive potential source 35 and negative potential source 28. Left-hand anode 313 of discharge device 302 is connected to the junction of resistors 310 and 311, and right-hand control electrode 314 is connected to the junction of resistors 311 and 312. A capacitor 315 is shunted across resistor 311. Right-hand control electrode 314 of discharge device 302 is coupled by lead 154 and capacitor 153 to junction 83 associated with discharge device 78 of Fig. 2. A glow discharge device 316 in series with a resistor 317 is connected between positive potential source 35 and junction 300.

There is also provided a dual electron discharge device 318 having cathodes 319 and 320 connected respectively to ground through potentiometers 321 and 322, to the movable arms of which are respectively connected leads 171 and 176 from the counter of Figs. 3 and 4. Control electrodes 323 and 324 of discharge device 318 are connected respectively to control electrodes 314 and 307 of discharge device 302. Trigger circuit 301 may be switched "on" manually by momentarily opening switch 306.

For the purpose of restoring trigger circuit 301 to its "on" condition, there is provided an electron discharge device 325, preferably of the triode type and having its cathode grounded. A resistor 326 is connected between control electrode 327 of discharge device 325 and the junction of resistors 328 and 329 connected in series between ground and negative potential source 28. Control electrode 327 is also coupled, by means of a capacitor 330 and lead 140, to junction 115 of trigger circuit 111 (Fig. 2). Resistors 331 and 332 are connected in series between anode 333 of discharge device 325 and positive potential source 35, and their junction 334 is coupled by a capacitor 335 to control electrode 307 of discharge device 302.

In operation during the first or "counting up" portion of the operating cycle of the system, trigger circuit 301 is in its "on" condition. The left-hand portion of discharge device 302 is non-conductive, so that right-hand control electrode 314 and hence right-hand control electrode 323 of discharge device 318 are substantially at ground potential. This causes increased conduction through the right-hand portion of discharge device 318 and a larger potential drop across potentiometer 321. Thus the potential of lead 171 is at its greater value. Since the right-hand portion of discharge device 302 is conductive, left-hand control electrode 307 and hence left-hand control electrode 324 of discharge device 318 are relatively negative with respect to ground. The resultant reduced conduction of the left-hand portion of discharge device 318 causes a smaller potential drop across potentiometer 322, so lead 176 is at its lesser value. As explained previously in connection with the counter of Figs. 3 and 4, the counter counts in a forward or ascending direction under these conditions.

As discussed above in connection with controller unit 12 of Fig. 2, at the completion of the first portion of the operating cycle, discharge device 78 becomes momentarily conductive. The resultant negative-going pulse at junction 83 is applied, by means of capacitor 153 and lead 154, to right-hand control electrode 314 of discharge device 302. This causes trigger circuit 301 to switch to its "off" condition, so that the left- and right-hand portions of discharge device 318 become respectively more and less conductive, and the potentials of leads 176 and 171 become high and low, respectively. Under these conditions, the counter of Figs. 3 and 4 is arranged to count in reverse or downwardly. The counter remains in this state for the second and third portions of the operating cycle.

When trigger circuit 111 (Fig. 2) switches to its "off" condition, signifying the end of the operating cycle, the resultant positive-going pulse at junction 115 is applied, by means of lead 140 and capacitor 330, to control electrode 327 of discharge device 325. This produces a negative-going pulse at junction 334 which is utilized by means of capacitor 335 to restore trigger circuit 301 to its "on" condition and the counter of Figs. 3 and 4 to the state of forward operation.

As previously described, junction 300 is connected by lead 274 to right-hand control electrode 272 of discharge device 270. When trigger circuit 301 is "off," corresponding to the condition for backward counting, junction 300 and hence control electrode 272 are relatively positive, so that the right-hand portion of discharge device 270 is highly conductive and gaseous discharge device 246 is prevented from firing. Upon completion of the backward counting portion of the operating cycle, trigger circuit 301 switches to its "on" condition, the potential of junction 300 and hence of control electrode 272 drops, and the right-hand portion of discharge device 270 becomes substantially non-conductive. Under this condition, gaseous discharge device 246 is free to fire again. This it does if, and only if, the value in the counter exceeds that corresponding to the unknown potential applied to terminal 17. If the unknown potential has decreased during the operating cycle to a value less than that corresponding to the previously determined counter value reduced by the reverse count, the system may go through several cycles until the value of the unknown potential is determined digitally with the counter operating in the forward direction.

The complement trigger

Let it now be assumed that the magnitude of the unknown potential is less than the value corresponding to the count or number of reverse steps the counter takes during each complete cycle. Under this condition, the counter would count downward or backward from the digital value related to the unknown potential, and would pass through zero to some value complemented to the maximum setting of the counter. The latter value, for the counter here shown and described by way of example, is 2047.

For the purpose of preventing such an occurrence there is provided, in accordance with the present invention, trigger circuit 160 (Fig. 4) comprising a dual electron discharge device 340 having its left-hand anode 341 connected through a resistor 342 to output terminal 299 and having its control electrodes 343 and 344 coupled respectively by capacitors 345 and 346 to the output of the last of the counter trigger circuits of box 159. A switch 347 is provided for restoring trigger circuit 160 to its "off" condition by momentarily opening. If desired, this switch may be ganged for simultaneous operation with switches 153 (Fig. 2) and 306 (Fig. 5), thus preparing the system initially for the measurement of unknown potentials.

When the counter passes from zero into the complement region, trigger circuit 160 is switched to "on" status. Left-hand anode 341 rises in potential, as does left-hand control electrode 276 of discharge device 270 (Fig. 5) to which it is connected. This in turn renders the left-hand portion of this discharge device highly conductive, so that gaseous discharge device 246 is prevented from firing. As the counter progresses forwardly to zero, however, trigger circuit 160 switches "off" and left-hand portion of discharge device 270 becomes substantially non-conductive. The system then continues to operate in the manner previously described, counting forwardly until the value of the unknown potential is reached.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A variable quantity measuring and manifesting device, comprising the combination of: a variable quantity source, a source of oscillations, a counter normally adapted to count said oscillations in a first direction, gating means interposed between said source of oscillations and said counter and adapted to control the flow of oscillations therebetween, translating means adapted for developing a potential proportional in magnitude to the setting of said counter, means for comparing said potential with said variable quantity and for actuating said gating means when said potential is proportional to said variable quantity, means for manifesting the setting of said counter after said actuation of said gating means, and means for again actuating said gating means and for adapting said counter to count said oscillations in the opposite direction.

2. A variable quantity measuring and manifesting device, comprising the combination of: a variable quantity source, a source of oscillations, a counter normally adapted to count said oscillations in a first direction, gating means interposed between said source of oscillations and said counter and adapted to control the flow of oscillations therebetween, translating means adapted for developing a potential proportional in magnitude to the setting of said counter, means for comparing said potential with said variable quantity and for actuating said gating means when said potential is proportional to said variable quantity, means for manifesting the setting of said counter after said actuation of said gating means, and means for again actuating said gating means and for adapting said counter to count said oscillations in the opposite direction for a substantially predetermined count.

3. A variable quantity measuring and manifesting device, comprising the combination of: a variable quantity source, a source of oscillations, a counter normally adapted to count said oscillations in a first direction, gating means interposed between said source of oscillations and said counter and adapted to control the flow of oscillations therebetween, translating means adapted for developing a potential proportional in magnitude to the setting of said counter, means for comparing said potential with said variable quantity and for actuating said gating means when said potential is proportional to said variable quantity, means for manifesting the setting of said counter after said actuation of said gating means, and means for again actuating said gating means and for adapting said counter to count said oscillations in the opposite direction for a controllable count.

4. A variable quantity measuring and manifesting device, comprising the combination of: a variable quantity source, a source of oscillations, a counter normally adapted to count said oscillations in a first direction, gating means interposed between said source of oscillations and said counter and adapted to control the flow of oscillations therebetween, translating means adapted for developing a potential proportional in magnitude to the setting of said counter, means for comparing said potential with said variable quantity and for actuating said gating means when said potential is proportional to said variable quantity, means for manifesting the setting of said counter after said actuation of said gating means, means for again actuating said gating means and for adapting said counter to count said oscillations in the opposite direction for a substantially predetermined count, and means for restoring said counter to its normal direction of counting said oscillations at the end of said count.

5. A variable quantity measuring and manifesting device, comprising the combination of: a variable quantity source, a source of oscillations, a counter normally adapted to count said oscillations in a forward direction, gating means interposed between said source of oscillations and said counter and adapted to control the flow of oscillations therebetween, translating means adapted for developing a potential proportional in magnitude to the setting of said counter, means for comparing said potential with said variable quantity and for actuating said gating means when said potential is proportional to said variable quantity, means for manifesting the setting of said counter after said actuation of said gating means, and means for again actuating said gating means and for adapting said counter to count said oscillations in a backward direction.

6. A variable quantity measuring and manifesting device, comprising the combination of: a variable quantity source, a source of oscillations, a counter normally adapted to count said oscillations in a forward direction, gating means interposed between said source of oscillations and said counter and adapted to control the flow of oscillations therebetween, translating means adapted for developing a potential proportional in magnitude to the setting of said counter, means for comparing said potential with said variable quantity and for actuating said gating means when said potential is proportional to said variable quantity, means for manifesting the setting of said counter after said actuation of said gating means, and means for again actuating said gating means and for adapting said counter to count said oscillations in a backward direction for a substantially predetermined count.

7. A variable quantity measuring and manifesting device, comprising the combination of: a variable quantity source, a source of oscillations, a counter normally adapted to count said oscillations in a first direction, normally open gating means interposed between said source of oscillations and said counter and adapted to control the flow of oscillations therebetween, translating means adapted for developing a potential proportional in magnitude to the setting of said counter, means for comparing said potential with said variable quantity and for closing said gating means when said potential is proportional to said variable quantity, means for manifesting the setting of said counter after said closing of said gating means, and means for re-opening said gating means and for adapting said counter to count said oscillations in the opposite direction.

8. A variable quantity measuring and manifesting device, comprising the combination of: a variable quantity source, a source of oscillations, a counter normally adapted to count said oscillations in a first direction, normally open gating means interposed between said source of oscillations and said counter and adapted to control the flow of oscillations therebetween, translating means adapted for developing a potential proportional in magnitude to the setting of said counter, means for comparing said potential with said variable quantity and for closing said gating means when said potential is proportional to said variable quantity, means for manifesting the setting of said counter after said closing of said gating means, and means for re-opening said gating means and for adapting said counter to count said oscillations in the opposite direction for a substantially predetermined count.

9. A variable quantity measuring and manifesting device, comprising the combination of: a variable quantity source, a source of oscillations, a counter normally adapted to count said oscillations in a forward direction, gating means interposed between said source of oscillations and said counter and adapted to control the flow of oscillations therebetween, translating means adapted for developing a potential proportional in magnitude to the setting of said counter, means for comparing said potential with said variable quantity and for actuating said gating means when said potential is proportional to said variable quantity, means for manifesting the setting of said counter after said actuation of said gating means, means for again actuating said gating means and for adapting said counter to count said oscillations in a backward direction for a substantially predetermined count, and means for restoring said counter to its normally forward direction of counting said oscillations at the end of said count.

10. A variable quantity measuring and manifesting device, comprising the combination of: a variable quantity source, a source of oscillations, a counter normally adapted to count said oscillations in a forward direction, normally open gating means interposed between said source of oscillations and said counter and adapted to control the flow of oscillations therebetween, translating means adapted for developing a potential proportional in magnitude to the setting of said counter, means for comparing said potential with said variable quantity and for closing said gating means when said potential is proportional to said variable quantity, means for manifesting the setting of said counter after said closing of said gating means, means for re-opening said gating means and for adapting said counter to count said oscillations in a backward direction for a substantially predetermined count, and means for restoring said counter to its normally forward direction of counting said oscillations at the end of said count.

11. A variable quantity measuring and manifesting device, comprising the combination of: a variable quantity source, a source of oscillations, a counter adapted to count said oscillations in a forward or backward direction, gating means interposed between said source of oscillations and said counter and adapted to control the flow of oscillations therebetween, translating means adapted for developing a potential proportional in magnitude to the setting of said counter, means for comparing the potential developed when said counter completes a count in the forward direction with said variable quantity and for actuating said gating means when said last-mentioned potential is proportional to said variable quantity, means for manifesting the setting of said counter after said actuation of said gating means, and means for again actuating said gating means and for adapting said counter to count said oscillations in the backward direction.

12. A variable quantity measuring and manifesting device, comprising the combination of: a variable quantity source, a source of oscillations, a counter adapted to count said oscillations in a forward or backward direction, gating means interposed between said source of oscillations and said counter and adapted to control the flow of oscillations therebetween, translating means aadpted for developing a potential proportional in magnitude to the setting of said counter, means for comparing the potential developed when said counter completes a count in the forward direction with said variable quantity and for actuating said gating means when said last-mentioned potential is proportional to said variable quantity, means for manifesting the setting of said counter after said actuation of said gating means, and means for again actuating said gating means and for adapting said counter to count said oscillations in the backward direction for a substantially predetermined count.

13. A variable quantity measuring and manifesting device, comprising the combination of: a variable quantity source, a source of oscillations, a counter adapted to count said oscillations in a forward or backward direction, gating means interposed between said source of oscillations and said counter and adapted to control the flow of oscillations therebetween, translating means adapted for developing a potential proportional in magnitude to the setting of said counter, means for comparing the potential developed when said counter completes a count in the forward direction with said variable quantity and for actuating said gating means when said last-mentioned potential is proportional to said variable quantity, means for manifesting the setting of said counter after said actuation of said gating means, means for again actuating said gating means and for adapting said counter to count said oscillations in the backward direction for a substantially predetermined count, and means for restoring said counter to the forward direction of counting said oscillations at the end of said count.

14. A variable quantity measuring and manifesting device, comprising the combination of: a variable quantity source, a source of oscillations, a counter normally adapted to count said oscillations in a first direction, normally open gating means interposed between said source of oscillations and said counter and adapted to control the flow of oscillations therebetween, translating means adapted for developing a potential proportional in magnitude to the setting of said counter, means for comparing said potential with said variable quantity and for sequentially closing and re-opening said gating means and for causing said counter to count in the opposite direction for a substantially predetermined count when said potential is proportional to said variable quantity, and means for manifesting the setting of said counter between said closing and said re-opening of said gating means.

15. A variable quantity measuring and manifesting device, comprising the combination of: a variable quantity source, a source of oscillations, a counter normally adapted to count said oscillations in a first direction, gating means interposed between said source of oscillations and said counter and adapted to control the flow of oscillations therebetween, means for developing a potential which changes as a function of said oscillations, means for comparing said potential with said variable quantity and for actuating said gating means when said potential is proportional to said variable quantity, means for manifesting the setting of said counter after said actuation of said gating means, and means for again actuating said gating means and for adapting said counter to count said oscillations in the opposite direction.

16. A variable quantity measuring and manifesting device, comprising the combination of: a variable quantity source, a source of oscillations, a counter normally adapted to count said oscillations in a first direction, gating means interposed between said source of oscillations and said counter and adapted to control the flow of oscillations therebetween, means for developing a potential which changes as a function of said oscillations, means for comparing said potential with said variable quantity and for actuating said gating means when said potential is proportional to said variable quantity, means for manifesting the setting of said counter after said actuation of said gating means, means for again actuating said gating means and for adapting said counter to count said oscillations in the opposite direction for a substantially predetermined count, and means for restoring said counter to its normal direction of counting said oscillations at the end of said count.

References Cited in the file of this patent

UNITED STATES PATENTS

| | | |
|---|---|---|
| 2,272,070 | Reeves | Feb. 3, 1942 |
| 2,539,623 | Heising | Jan. 30, 1951 |
| 2,568,724 | Earp et al. | Sept. 25, 1951 |
| 2,616,965 | Hoeppner | Nov. 4, 1952 |

OTHER REFERENCES

"The Binary Quantizer," by K. H. Barney; Electrical Engineering; November 1959; pages 962–967.